(12) United States Patent
Roth

(10) Patent No.: US 12,163,332 B2
(45) Date of Patent: *Dec. 10, 2024

(54) METHOD OF ATTACHING A LOAD TO METAL DECKING

(71) Applicant: Steven A. Roth, Alamo, CA (US)

(72) Inventor: Steven A. Roth, Alamo, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/113,867

(22) Filed: Feb. 24, 2023

(65) Prior Publication Data

US 2023/0220668 A1   Jul. 13, 2023

Related U.S. Application Data

(60) Division of application No. 16/927,869, filed on Jul. 13, 2020, now Pat. No. 11,598,092, which is a continuation-in-part of application No. 15/847,743, filed on Dec. 19, 2017, now Pat. No. 10,718,112, which is a division of application No. 15/018,054, filed on Feb. 8, 2016, now Pat. No. 9,850,659.

(51) Int. Cl.
| | |
|---|---|
| *E04B 1/00* | (2006.01) |
| *E04B 9/00* | (2006.01) |
| *F16B 2/04* | (2006.01) |
| *F16B 2/06* | (2006.01) |
| *F16M 13/02* | (2006.01) |

(52) U.S. Cl.
CPC ............... *E04B 9/00* (2013.01); *F16B 2/04* (2013.01); *F16B 2/065* (2013.01); *F16M 13/02* (2013.01)

(58) Field of Classification Search
CPC ............... E04B 9/00; F16B 2/04; F16B 2/065
See application file for complete search history.

(56) References Cited

U.S. PATENT DOCUMENTS

| | | | | |
|---|---|---|---|---|
| 112,972 | A * | 3/1871 | Sherry ............... | B65G 21/2072 403/306 |
| 269,608 | A * | 12/1882 | Wain .................. | F16B 2/04 403/306 |
| 444,578 | A * | 1/1891 | Jackson ............. | B65G 21/2072 403/306 |
| 833,386 | A * | 10/1906 | Helm ................. | F16B 2/04 403/306 |
| 862,166 | A * | 8/1907 | Iversen ............. | B65G 21/2072 403/306 |

(Continued)

*Primary Examiner* — Basil S Katcheves
(74) *Attorney, Agent, or Firm* — Steven R. Vosen

(57) ABSTRACT

A method of using a hanger for supporting a load from an underside of a metal decking is described. The metal decking has a trough with a first groove opposing a second groove, and the hanger includes a flexible body which has an unflexed length that is greater than the groove spacing and is adapted to accept a load from a rod, cable, or wire. The method includes inserting the load support assembly through the aperture; contacting the first end of the body with the first groove of the metal decking; flexing the body to decrease the distance between the first end and the second end to a distance equal to or less than the groove spacing; and contacting the second end of the flexible body with the second groove of the metal decking. The body supports the load support assembly between the first groove and the second groove, and such that the load support assembly is movable relative to the flexible body.

21 Claims, 11 Drawing Sheets

(56) References Cited

U.S. PATENT DOCUMENTS

| | | | | |
|---|---|---|---|---|
| 1,208,481 A * | 12/1916 | Cathcart | B65G 21/2072; 403/306 |
| 1,679,881 A * | 8/1928 | Simpson | A47H 1/022; 211/105.4 |
| 1,921,421 A * | 8/1933 | Marsilius | F16B 2/04; 384/30 |
| 2,263,543 A * | 11/1941 | Murphy | G05G 1/085; 403/372 |
| 2,293,168 A * | 8/1942 | Pirone | A47H 1/022; 211/105.4 |
| 2,651,531 A * | 9/1953 | Smith | F16B 2/04; 279/83 |
| 2,713,983 A * | 7/1955 | Kay | H02G 3/125; 248/200.1 |
| 2,835,517 A * | 5/1958 | Beerli | F16B 21/10; 464/41 |
| 2,988,396 A * | 6/1961 | Davies | F16B 29/00; 294/93 |
| 3,372,523 A * | 3/1968 | Hall, Jr. | E04B 1/4157; 52/39 |
| 3,437,060 A * | 4/1969 | Giambalvo | F16B 12/20; 211/187 |
| 3,514,917 A * | 6/1970 | James, Sr. | E04B 1/4121; 52/707 |
| 3,535,673 A * | 10/1970 | Loose | H01R 4/26; 439/444 |
| 3,663,064 A * | 5/1972 | McCarroll | B60B 7/063; 301/37.42 |
| 3,721,463 A * | 3/1973 | Attwood | F16B 9/056; 248/219.2 |
| 3,769,774 A * | 11/1973 | Barnes | F16L 3/14; 52/39 |
| 4,085,558 A * | 4/1978 | Albrecht | E04B 5/48; 52/630 |
| 4,176,480 A * | 12/1979 | Euzarraga | G09F 15/0012; 40/739 |
| 4,368,564 A * | 1/1983 | Martin | A47B 13/08; 24/458 |
| 4,405,111 A * | 9/1983 | Lennon | E04C 3/02; 211/105.4 |
| 4,472,702 A * | 9/1984 | Johansson | F16B 4/006; 411/80 |
| 4,547,092 A * | 10/1985 | Vetter | A61G 7/0503; 248/229.11 |
| 4,659,051 A * | 4/1987 | Propp | E04B 9/18; 248/200.1 |
| 4,682,452 A * | 7/1987 | Propp | E04B 9/006; 220/3.9 |
| 4,746,127 A * | 5/1988 | Westhoff | E03F 5/024; 285/237 |
| 4,784,087 A * | 11/1988 | Chevalier | F24H 1/182; 122/234 |
| 4,909,405 A * | 3/1990 | Kerr, Jr. | H02G 3/125; 220/3.9 |
| 5,024,412 A * | 6/1991 | Hung | H02G 3/20; 220/3.9 |
| 5,224,806 A * | 7/1993 | Duran | F16B 41/002; 411/33 |
| 5,370,485 A * | 12/1994 | Kanazawa | F16B 5/02; 411/55 |
| 5,428,936 A * | 7/1995 | Roth | E04B 1/4157; 248/327 |
| 5,586,364 A * | 12/1996 | Ferrari | F16B 21/02; 411/46 |
| 5,720,461 A * | 2/1998 | Kerr, Jr. | E04B 9/006; 248/317 |
| 6,231,109 B1 * | 5/2001 | Beaver | F16B 2/185; 296/214 |
| 6,595,479 B2 * | 7/2003 | Johnson | H02G 3/125; 248/200.1 |
| 6,607,233 B1 * | 8/2003 | Beaver | B60J 3/023; 296/214 |
| 7,011,578 B1 * | 3/2006 | Core | F24F 13/06; 454/292 |
| 7,093,400 B1 * | 8/2006 | Thompson | E04B 9/18; 52/704 |
| 9,091,372 B2 * | 7/2015 | Lacour | F16L 3/133 |
| 10,718,112 B1 * | 7/2020 | Roth | F16B 2/065 |
| 11,598,092 B1 * | 3/2023 | Roth | F16M 13/02 |
| 2002/0190478 A1 * | 12/2002 | Mirales | F16B 2/08; 277/576 |
| 2005/0089367 A1 * | 4/2005 | Sempliner | F16B 2/185; 403/381 |
| 2009/0272067 A1 * | 11/2009 | Gilham | E04B 1/4157; 52/707 |
| 2011/0174951 A1 * | 7/2011 | Sander, Jr. | E04B 9/18; 248/339 |

\* cited by examiner

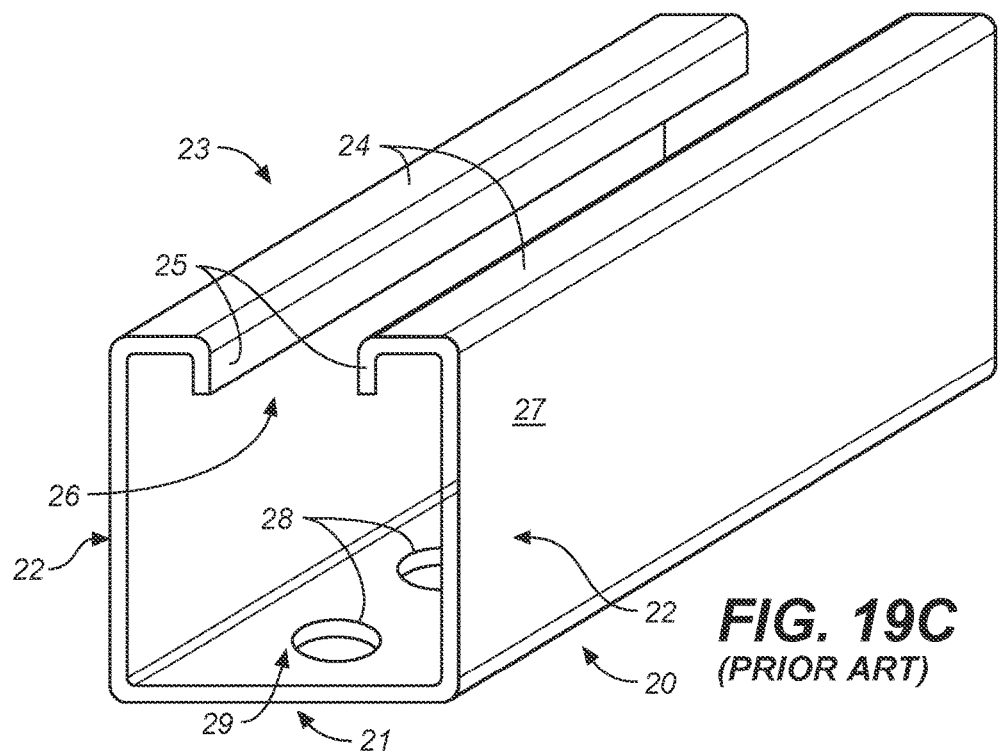
FIG. 19C (PRIOR ART)
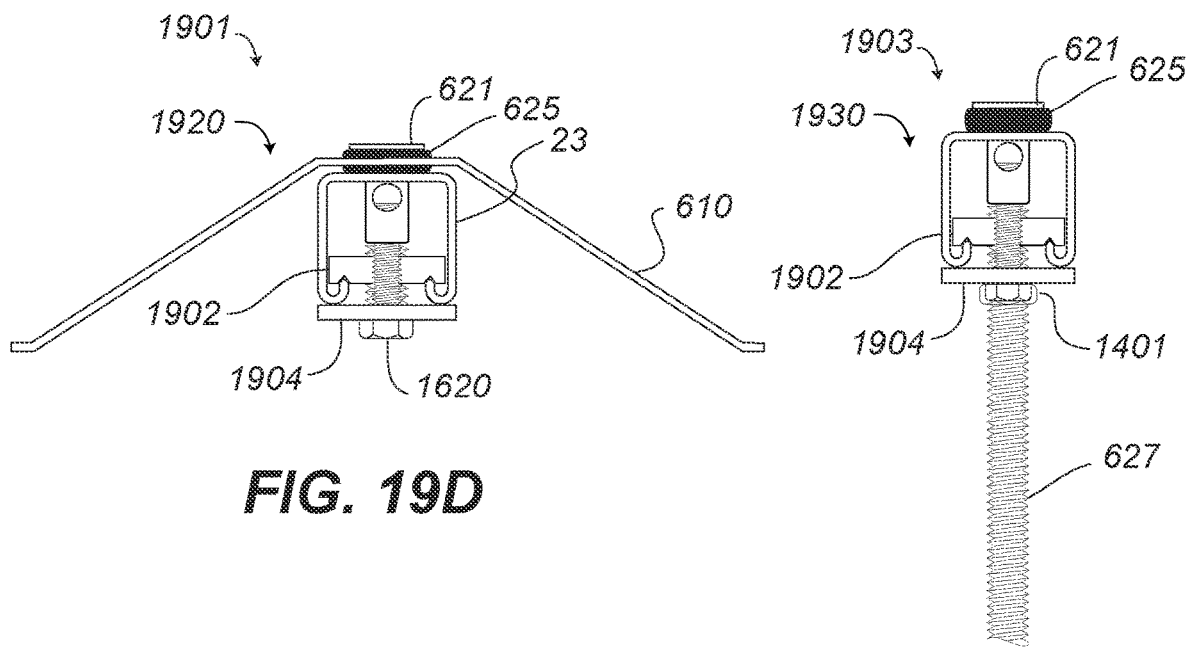
FIG. 19D
FIG. 19E

METHOD OF ATTACHING A LOAD TO METAL DECKING

CROSS-REFERENCE TO RELATED APPLICATIONS

This application is a divisional of U.S. patent Ser. No. 16/927,869, filed Jul. 13, 2020, which is a continuation-in-part of U.S. patent application Ser. No. 15/847,743, filed Dec. 19, 2017, which is a divisional of U.S. patent application Ser. No. 15/018,054, filed Feb. 8, 2016 which issued on Dec. 26, 2017 as U.S. Pat. No. 9,850,659, the contents of which are hereby incorporated by reference in its entirety.

BACKGROUND OF THE INVENTION

Field of the Invention

The present invention relates to the building construction industry, and more particularly to a method for hanging loads from the underside of an overhead metal decking.

Discussion of the Background

It is standard practice in the construction of commercial buildings to use corrugated metal decking as the floor of each story of a building. It is also common practice to suspend items below the metal decking for the purpose of connecting to suspended utility loads, such as service elements, including conduits, pipes, ducting, systems, and the like (referred to herein collectively as a "conduit").

FIG. 1A is a top view of a prior art metal decking 10 and FIG. 1B is a sectional view 1B-1B of FIG. 1A, illustrating a prior art hanger 1 attached to the underside of the prior art metal decking. Example of metal decking 10 include, but are not limited to, VERCO (VERCO METAL DECKING, INC., Phoenix, AZ) models PLW2, W2 FORMLOK™, PLW3, or W3 FORMLOK™.

Metal decking 10 is typically formed from one or more metal sheets of 16-22 gauge formed into a corrugated structure and which may include concrete on one side of the metal. Thus, for example, FIG. 1A shows metal decking 10 as having a width W and a length L, and including a number of features that extend the length of the metal decking. Specifically, metal decking 10 is shown as having a plurality of generally horizontal upper flutes 13 with width WU, a plurality of generally horizontal lower flutes 15 a distance D from the upper flutes and having a width WL, and ribs 16 and 17 that connect adjacent lower flutes. Metal decking 10 is shown, in FIG. 1B, as including concrete 12 which is poured over the top of the metal decking.

The internal portions of metal decking 10 may be considered to include a plurality troughs 14 having a width that varies from width WU at an upper end to width WT at a lower end, which is formed by a pair of adjacent and opposing and mutually facing ribs 16 and 17 and the upper flute 13 that is in between the pair of ribs.

Flutes 13 and 15 and ribs 16 and 17 are generally planar, with the flutes horizontal and the ribs being either sloped, as shown in FIG. 1B or vertical. In certain embodiments, flutes 13 and 15 and ribs 16 and 17 may include indentations, vent holes, undulations, corrugations, or grooves. FIG. 1B shows, for example, that a rib 16 includes groove 18 and that a rib 17 include groove 19, where the grooves extend along the length L of metal decking 10.

It is a typical commercial building construction practice to attach hangers to the underside of overhead metal decking filled with hardened concrete by drilling a hole through the metal decking and hardened concrete, and installing a concrete anchor into the hole in the concrete. FIG. 1B shows a prior art hanger 1, which includes a concrete anchor 3 supported by concrete 12, and a metal hanger 2 attached to the concrete anchor 3.

While prior art hangers, such a hanger 1, are widely used, there are several problems associated with such hangers. First, attaching the hangers involves drilling through two types of material—metal and concrete. This type of operation is noisy and can cause vibrations of the metal decking structure. While this may not be an issue for new construction, it can be problematic for retrofitting structures, where tenants may be occupying the building.

In addition, drilling or otherwise opening a hole in concrete fractures the concrete and reduces the strength of the concrete for some distance in the concrete. Thus, one may have to space the anchors sufficiently far apart to provide sufficient structural support for the anchors.

Further, when they are subject to seismic events, prior art hangers may pull away from the metal decking in a manner that damages the metal decking and/or concrete.

There is a need in the art for an easier method for attaching a hanger to a metal decking. Such a method should be able to support sufficient weight to permit the hanging of conduits, should be easy to attach to the underside of metal decking, should involve reduced noise and vibration over prior art techniques, and should allow a user to space the hangers closely. Such a device and method should also be usable for metal decking that does not include concrete reinforcement. There is also a need in the art for a method that permits hanging a load under nonhorizontal surfaces that will not damage the deck that it is attached to during seismic events.

BRIEF SUMMARY OF THE INVENTION

The present invention overcomes the disadvantages of prior art methods of hanging conduits from metal decking. In one embodiment, a hanger is placed horizontally across the trough of a corrugated metal decking.

In some aspects, the techniques described herein relate to a method of using a hanger for supporting a load from an underside of a metal decking, where the metal decking has a trough having a first groove opposing a second groove, where the first groove and said second groove have a groove spacing, where the hanger includes a body, where the body is flexible and has an unflexed distance between a first end and a second end that is greater than the groove spacing and an aperture, and where the hanger further includes a load support assembly removably insertable through the aperture and movable relative to the body and adapted to support the load, said method including: inserting the load support assembly through the aperture; contacting the first end of the body with the first groove of the metal decking; flexing the body to decrease the distance between the first end and the second end to a distance equal to or less than the groove spacing; and contacting the second end of the flexible body with the second groove of the metal decking, such that the body supports the load support assembly between the first groove and the second groove, and such that the load support assembly is movable relative to the flexible body.

These features together with the various ancillary provisions and features which will become apparent to those skilled in the art from the following detailed description, are attained by the methods of attaching a hanger to a metal decking of the present invention, embodiments thereof being shown with reference to the accompanying drawings, by way of example only, wherein:

BRIEF DESCRIPTION OF THE FIGURES

FIG. 4A is a side elevational view.

FIGS. 5A and 5B are several views of a third embodiment hanger, where FIG. 5A is a side elevational view and FIG. 5B is a top plan view;

FIG. 6A is a side elevational view and FIG. 6B is a top plan view;

FIG. 19C is a perspective view of a prior art strut channel;

FIG. 19D is a side view of one hanger of the tenth embodiment hanger;

FIG. 19E is a side view of hanger support of the tenth embodiment hanger;

Reference symbols are used in the Figures to indicate certain components, aspects or features shown therein, with reference symbols common to more than one Figure indicating like components, aspects or features shown therein.

DETAILED DESCRIPTION OF THE INVENTION

Methods are described herein for attaching a hanger to a metal decking. While these methods are illustrated using hangers described herein, the invention is not limited to the use of such hangers.

Figure 2A:
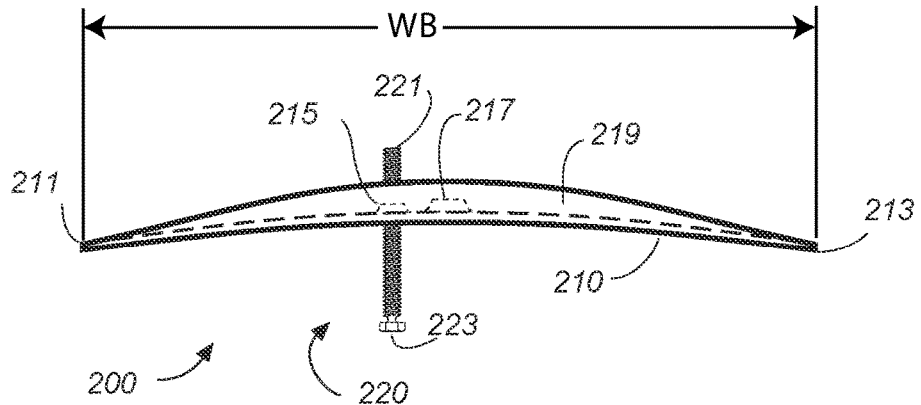
FIGS. 2A and 2B are a side elevational view and top plan view, respectively, of a first embodiment of a hanger.
Figure 2B:
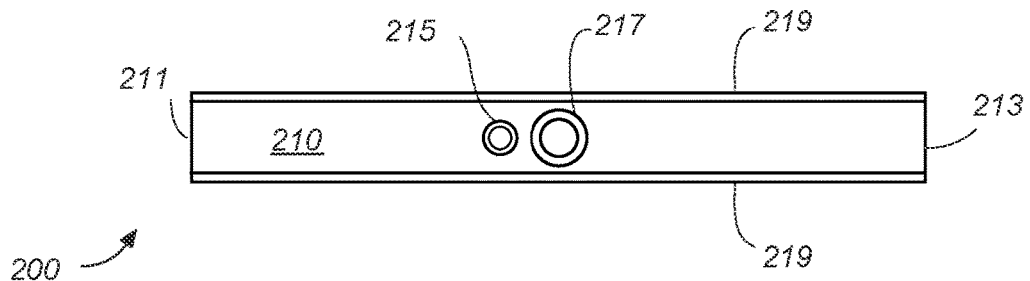

FIG. 2A is a side elevational view of a first embodiment of a hanger 200, and FIG. 2B is a top plan view of the hanger. Hanger 200 includes a body 210 that extends a distance WB from a first end 211 to a second end 213, and includes sides 219, which generally extends perpendicular to the body, and threaded holes 215 and 217. Body 210 is formed from a high yield strength material that returns to its original shape after being stressed, and may be, for example and without limitation, made of a spring steel material. In certain embodiments, body 210 is a unitary body, and the length between ends 211 and 213 is adjusted by flexing the body to bring the ends closer to each other. In certain other embodiments, there is no other mechanism provide for moving ends 211 and 213 relative to each other.

Figure 1A:
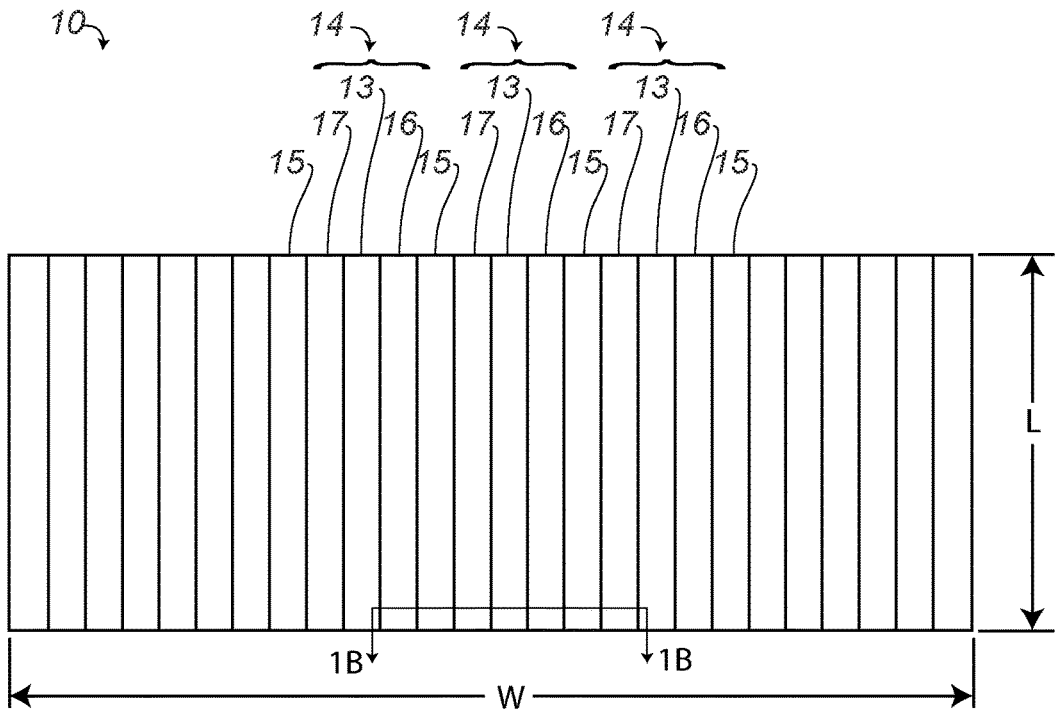
FIG. 1A is a top view of a prior art metal decking.
Figure 3:
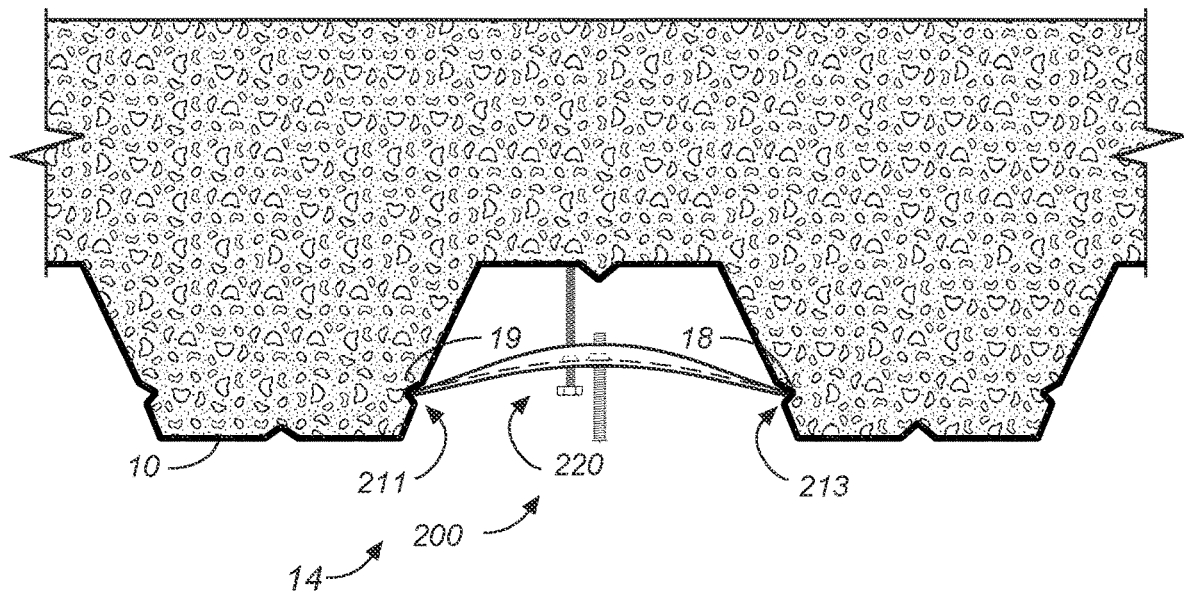
FIG. 3 is an elevational cross-sectional view of the hanger of FIGS. 2A and 2B as installed on a metal decking.

FIG. 3 is an elevational cross-sectional view of hanger 200 installed on the underside of concrete-filled metal decking 10. Thus, for example, metal decking typically has a trough width of from 4 inches to 8 inches, and hanger 200 is sized to fit within, or fully within, the trough and while contacting opposing surfaces, such as adjacent ribs 16 and 17 or opposing grooves 18, 19. In various embodiments, the inventive hangers, including but not limited to hanger 200 contacts adjacent ribs that at a distance of 4 inches, 5 inches, 6 inches, 7 inches, or 8 inches, and, in certain embodiments, is sized to be contact adjacent ribs with a distance of from 4 inches to 8 inches, from 5 inches to 8 inches, from 6 inches to 8 inches, or from 7 inches to 8 inches. In certain embodiments, the width WU is less that the width WT, as shown in FIG. 1A. In certain other embodiments, the width WU is approximately equal to width WT.

Figure 1B:
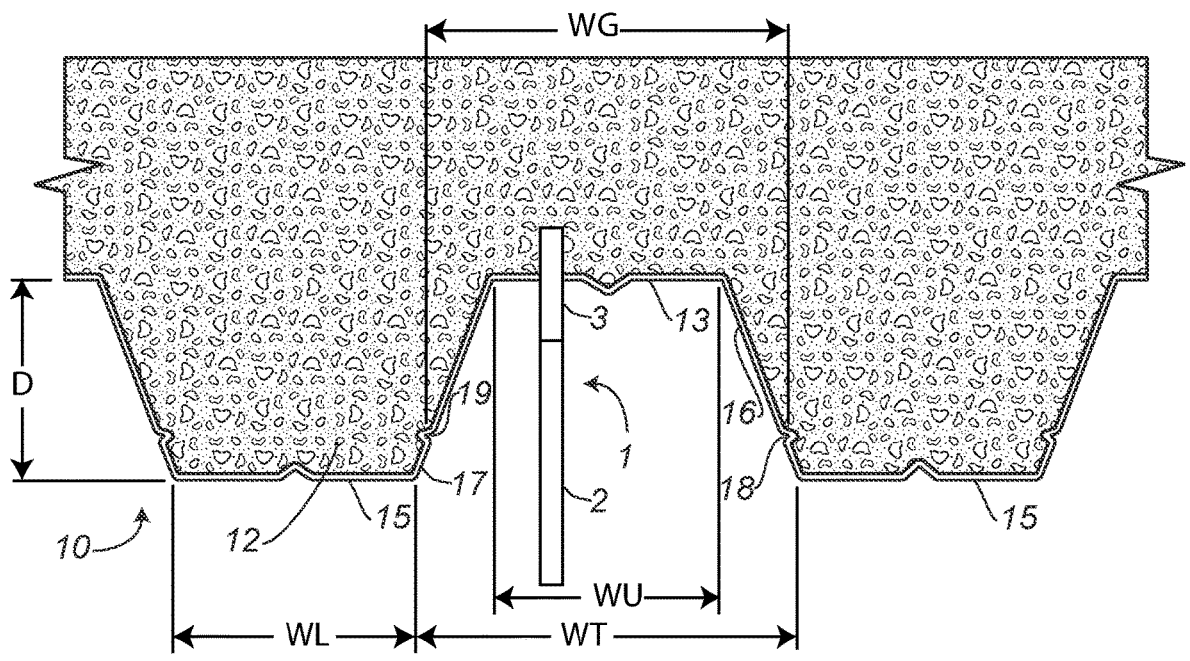
FIG. 1B is a sectional view 1B-1B of FIG. 1A, illustrating a prior art hanger attached to the underside of the prior art metal decking.

As shown in FIG. 3, body 210 can be is installed within grooves 18, 19, which have a horizontal spacing WG, as shown in FIG. 1B. In certain embodiments, body 210 has an unflexed length, WB, that is longer than horizontal spacing WG. Body 210 is flexible and capable of being snapped, twisted, or otherwise forced between grooves 18 and 19. When installed, body 210 in compression from forces on first end 211, which is inserted into groove 19 and on second end 213 which is inserted into groove 18.

In one embodiment of a method of installing body 210, the user places ends 211/213 in grooves 18/19 by pushing the hanger towards metal decking 10. The act of pushing body 210 into metal decking 10 causes body 210, including sides 219 to flex and then relax as ends 211/213 fit into grooves 18/19. In certain embodiments, body 210 so placed is thus slightly flexed and in tension against ribs 16 and 17. As a result, the hanger stays firmly held in place in compression as in certain other embodiments described herein.

In certain embodiments, a rod 220 having a distal end 221 and a proximal end 223 may be used for securing hanger 200 against metal decking 10. Rod 220 may be threaded at one or both ends, or may be a threaded rod. Body 210 includes a threaded hole 215 for accepting the threads of rod 220. Rod 220 includes a hex nut 223 for tightening the rod through threaded hole 215. To install this embodiment of hanger 200, the user places ends 211/213 in grooves 18/19 by pushing the hanger into the metal decking, and or by turning the hanger perpendicular to the metal decking to cause the ends to fit into the groove. Next, nut 223 is tightened. This causes distal end 221 to push against metal decking 10 and, with sufficient torque on nut 223, pushes the central part of body 210 away from the metal decking. In certain other embodiments, hanger 200 may be used to hand attachments using threaded hole 217.

In certain other embodiments, a load on hanger 200 may be supported by cables, wires, or brackets connected to rod 200 and/or threaded hole 215.

In one embodiment, nut 223 may include a torque-off hex head such that a proper torque is applied to hanger 200. Thus, for example, nut 223 may torque off of rod 220 at a torque of from 3 to 6 ft-lbs., or at a lower or higher torque. In one embodiment, rod 220 is a ¼ inch bolt, and is long enough to allow the distal end of the threaded rod to touch the upper flute of the metal decking when torqued.

Figure 4A:
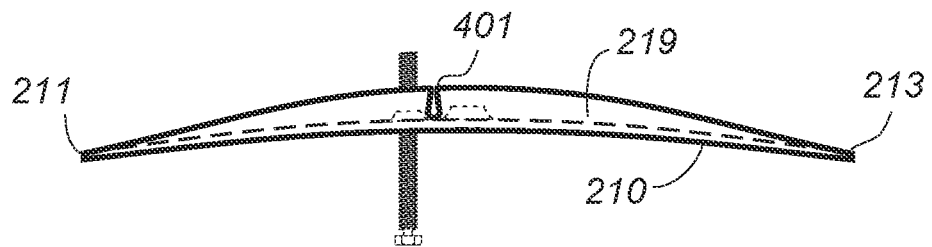
FIGS. 4A and 4B are several views of a second embodiment hanger, where
Figure 4B:
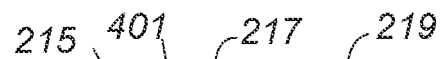

FIGS. 4A and 4B are several views of a second embodiment hanger 400, where FIG. 4A is a side elevational view, and FIG. 4B is a top plan view. Hanger 400 is generally similar to hanger 200, except as explicitly noted.

Hanger 400 differs from hanger 200 in that both sides 219 include a notch 401. The presence of notches 401 allow the arched body 210 to more easily flex to fit between grooves 18/19, and to snap into place more easily.

Figure 5A:
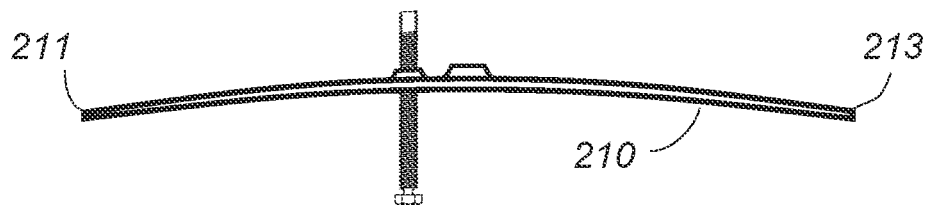
Figure 5B:
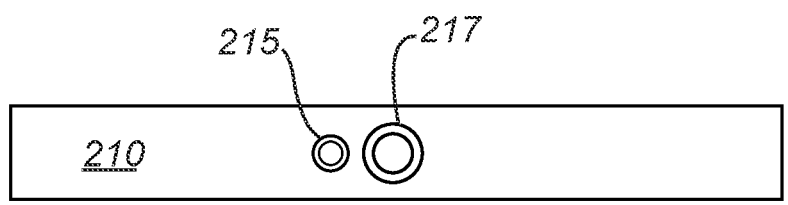
FIG. 5B is a top plan view.

FIGS. 5A and 5B are several views of a third alternative embodiment hanger 500, where FIG. 5A is a side elevational view and FIG. 5B is a top plan view. Hanger 500 is generally similar to hangers 200 and 400, but is formed without sides 219.

Figure 6A:
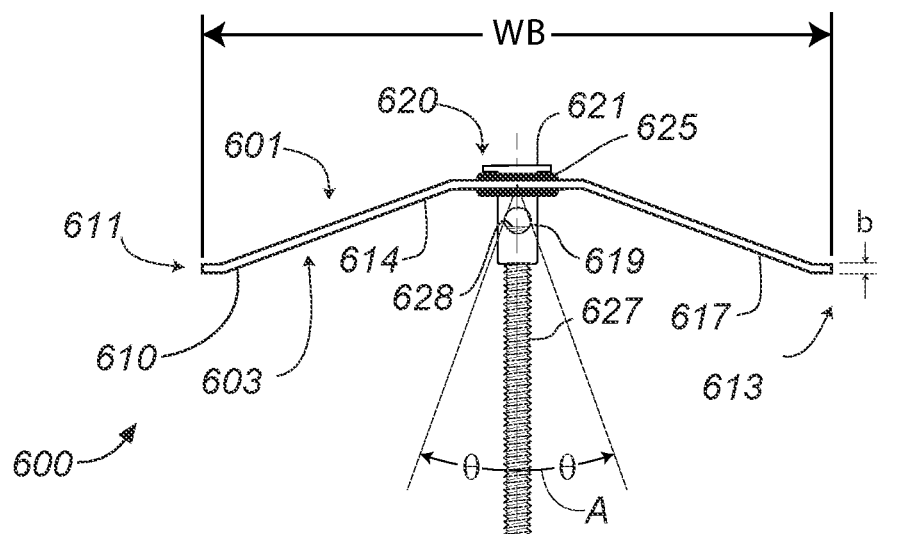
FIGS. 6A and 6B are several views of a fourth embodiment hanger, where
Figure 6B:
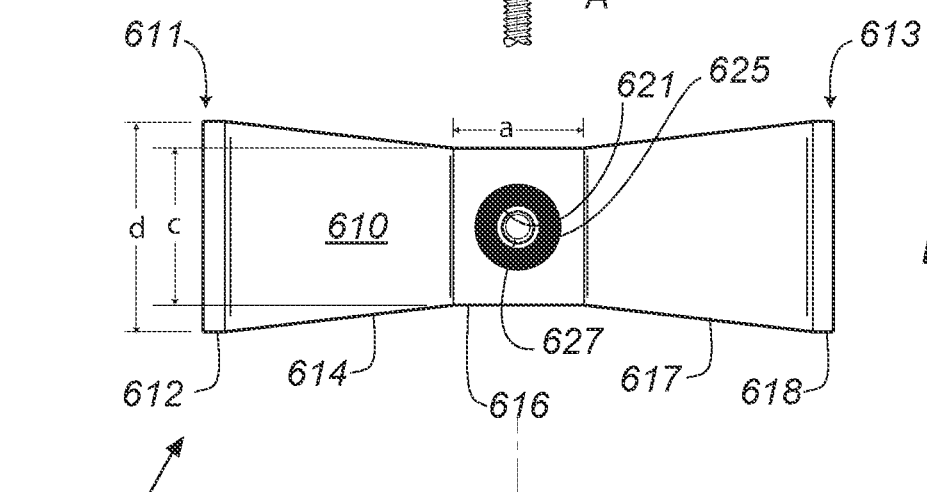
Figure 7:
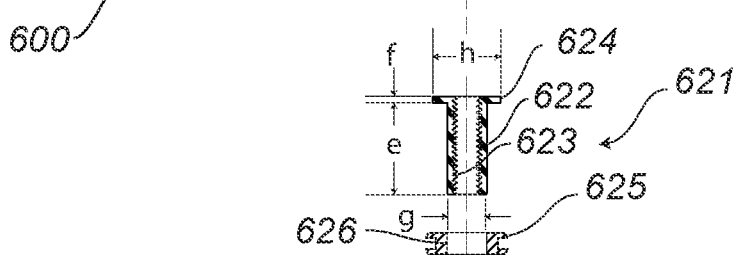
FIG. 7 is an exploded elevational view of the hanger of FIGS. 6A and 6B.
Figure 7:
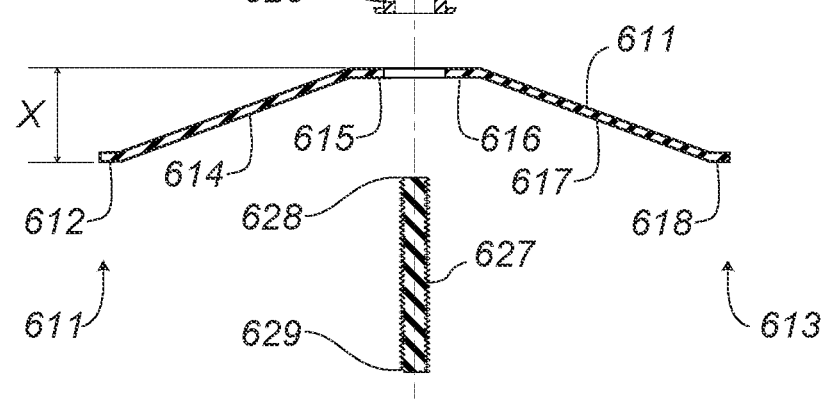

FIGS. 6A and 6B are several views of a fourth embodiment hanger 600, where FIG. 6A is a side elevational view and FIG. 6B is a top plan view, and FIG. 7 is an exploded elevational view of the hanger 600. Hanger 600 is generally similar to hangers 200 or 400, except as explicitly noted.

Hanger 600 includes a body 610, which is generally similar to body 210, except as explicitly noted, and an assembly 620, which may include, but is not limited to, a rod support, or connector 621, an optional grommet 625, and a rod 627.

Body 610 has a top surface 601 and a bottom surface 603, and extends between a first end 611, which is generally similar to first end 211 and second end 613, which is generally similar to second end 213, and has an aperture between ends 611 and 613. Body 610 has an arched shape formed of several planar portions which are, sequentially: a first end portion 612 including first end 611, a second portion 614, a third, central portion 616 including an aperture 615, a fourth portion 617, and a second end portion 618 including second end 613. In certain embodiments, which is not meant to limit the scope of the present invention, portions 612 and 618 are generally coplanar, and central portion 616 is in a plane parallel to that of portions 612 and 618 and displaced by a distance X.

Rod 627 extends from a first end 628 to a second end 629 and may have external threads at one or both ends, or may be a threaded rod. First end 628, or a portion of rod 627 near the first end, is attached to connector 621, as discussed subsequently, and second end 629 is adapted to support a load. In one embodiment, rod 627 is formed from ASTM A36 steel and has a diameter of ⅜"-16 threaded rod.

Grommet 625, which is made of a plastic, or a rubber is sized to fit within aperture 615 and includes a grommet hole 626 through the center of the grommet. In one embodiment, grommet 625 is a VIBLSO™ grommet.

Connector 621 has a cylindrical body 622 sized to fit in grommet hole 626, an internal threaded aperture 623 adapted for threading with rod 627, and a flange 624 that is size to not fit through aperture 615. In one embodiment, connector 621 is adapted to accept a ⅜"-16 threaded rod. Connector 621 also has an optional hole 619 to allow inspection of the location of first end 628.

As an example of embodiments of hanger 600 sized to support a load from the underside of a W3 sized metal decking, such as a W3 FORMLOK™ metal decking (manufactured by VERCO METAL DECKING, INC., Phoenix, AZ), which as a having nominal a groove-to-groove spacing WG of 7 5/16 inches, body 610 may formed from spring steel having a thickness having the following dimensions: an overall length, WB, of 7½ inches, a height, X, of 1 inch, a maximum width, d, of 2½ inches, a central portion having a length, a, of 1.5 inches, a width, c, of 1¾ inches and aperture 615 has a diameter of ¾ inch. Connector 621 has flange 624 having a diameter, h, of ¾ inch and thickness, f, of 1/16 inch, and a cylindrical body 622 having a length, e, of 1 inch, and a diameter, g, of ½ inch. With these dimensions, the length WB of body 610 is longer than the groove-to-groove spacing WG, and the body must be flexed to fit within grooves, and cylindrical body 622 fits through the aperture of body 610 with the weight of the hanger supported by flange 624 resting on top of body 610.

Hanger 600 may be assembled by placing grommet 625 into aperture 615, by placing cylindrical body 622 through grommet hole 626 with flange 624 in contact with the grommet, and threading rod 627 into internal threaded aperture 623. Body 610 may then be placed between portions of metal decking 10, such as by pushing body 610 towards the metal decking such that ends 611 and 613 contact grooves 18 and 19, respectively.

Rod 627 is threaded into threaded aperture 623 sufficiently far to allow rod 627 to support a load. First end 628 may thus be below bottom surface 603 and can be seen, for example, through hole 619. In an alternative embodiment, rod 627 is threaded such that first end 628 contacts metal decking 10, thus providing stability to hanger 600, especially during a seismic event.

Due to clearances of the various components and compressibility of grommet 625, rod 627 may move in a plane perpendicular to central portion 616, either as shown arrow, A, and/or in a directing into and out of the plane of FIG. 6A. In certain embodiments, rod 627 may by an angle of up to $\theta = \pm 30°$ perpendicular to body 610. The ability of rod 627 to move, as well as any suspended load, limits the amount of load transferred to metal decking 10 in the event of seismic activity.

Further, since rod 627 may move relative to a line perpendicular to body 610, hanger 600 can adjust to the orientation of the grooves relative to the horizon. In certain embodiments, grooves 18 and 19, and thus body 610 installed on metal decking 10, lie in a horizontal plane, and rod 627 is in a vertical orientation. In certain other embodiments, grooves 18 and 19, and thus body 610 installed on metal decking 10, do not lie in a horizontal plane. This may result, for example, from manufacturing irregularities in metal decking 10, or from a metal decking being installed on a slope, such as for roof. Since rod 627 can move relative to body 610 by up to an angle θ, as illustrated in FIG. 6A, a hanger 600 installed in such configuration will support a load with rod 627 in a vertical orientation. In certain embodiments where the grooves do not lie in a horizontal plane and there is sufficient room for movement of the assembly 620, the assembly does not impart a torque on body 610.

Thus, if grooves 18 and 19 are not in a horizontal plane, due to manufacturing irregularities in metal decking 10, or from a metal decking being installed on a slope, such as for roof, body 610, and thus aperture 615 will not be in a horizontal plane. Since rod 627 can move relative to body 610 by up to an angle θ, hanger 600 permits supporting a load with rod 627 in a vertical to the horizon.

Since the hanger is longer than the groove spacing, body 610 must bent and or forced into the grooves. The amount of force required to install the hanger and the load carrying capacity depend, in part, on the material and dimensions of body 610 body.

While connector 621 and rod 627 are described above and being threaded together, other method of removably attaching the connector and rod may be used, such as by using a pin to join the two pieces. Alternatively, connector 621 and rod 627 may a single piece, such as forming them from a piece of metal or by permanently joining the connector and rod, as by welding the parts together.

Optionally, hanger 600 may be assembled without a grommet by placing cylindrical body 622 through hole 626 with flange 624 in contact top surface 601, and threading rod 627 into internal threaded aperture 623.

FIGS. 8-11B are alternative embodiments of body 610, each extending from first end 611 to second end 613 and having an aperture 615. The embodiments of FIGS. 8-11B are generally similar to body 610 and each other, except as explicitly stated, and which may be used with one or more components of assembly 620.

Figure 8:
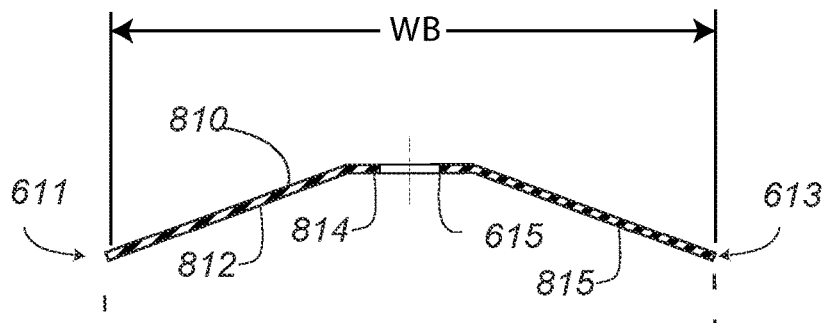
FIG. 8 is a side elevational view of a second embodiment body of the hanger of FIGS. 6A and 6B.

FIG. 8 is a side elevational view of a first alternative embodiment body 810. Body 810 is formed of several planar portions: a first end portion 812 including first end 611, a second end portion 815 including second end 613, and a central portion 814 including aperture 615 and connecting portions 812 and 815. The main difference between body 810 and body 610 is the shape of the body near ends 611 and 613, where portions 812 and 815 extend straight to ends 611 and 613, respectively.

Figure 9:
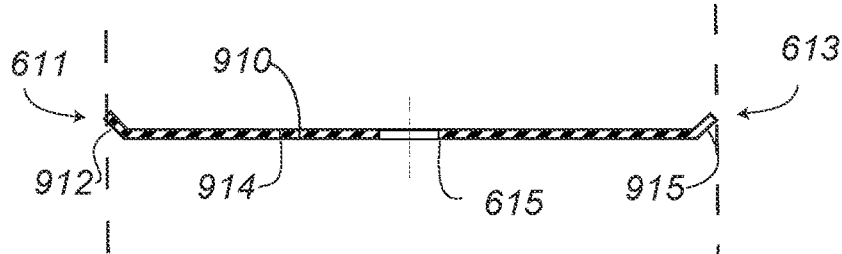
FIG. 9 is a side elevational view of a third embodiment body of the hanger of FIGS. 6A and 6B.

FIG. 9 is a side elevational view of a second alternative embodiment body 910. Body 910 has several planar portions: a first end portion 912 including first end 611, a second end portion 915 including second end 613, and a central portion 914 including aperture 615 and connecting portions 912 and 915. Body 910 is generally flat, with end portions 912 and 915 angled up from central portion 914.

Figure 10:
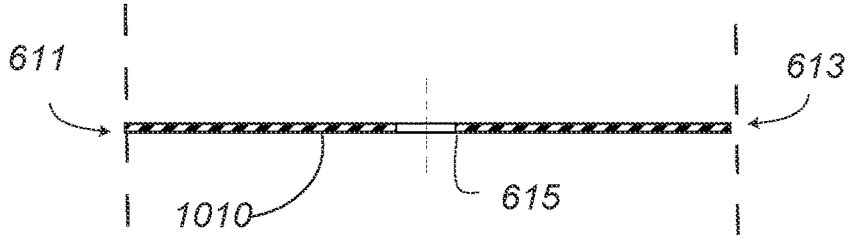
FIG. 10 is a side elevational view of a fourth embodiment body of the hanger of FIGS. 6A and 6B.

FIG. 10 is a side elevational view of a third alternative embodiment body 1010. Body 1110 is planar from first end 611 to second end 613.

Figure 11A:
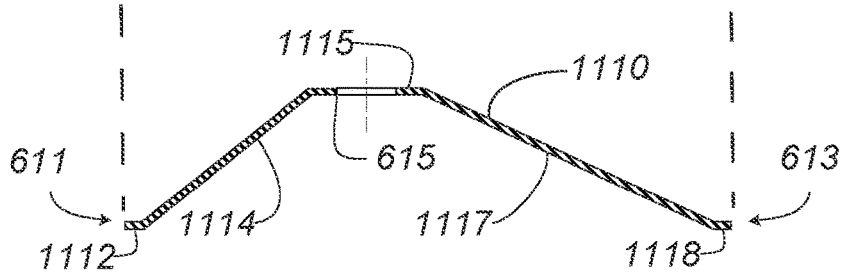
FIG. 11A is a side elevational view of a fifth embodiment body of the hanger of FIGS. 6A and 6B.
Figure 11B:
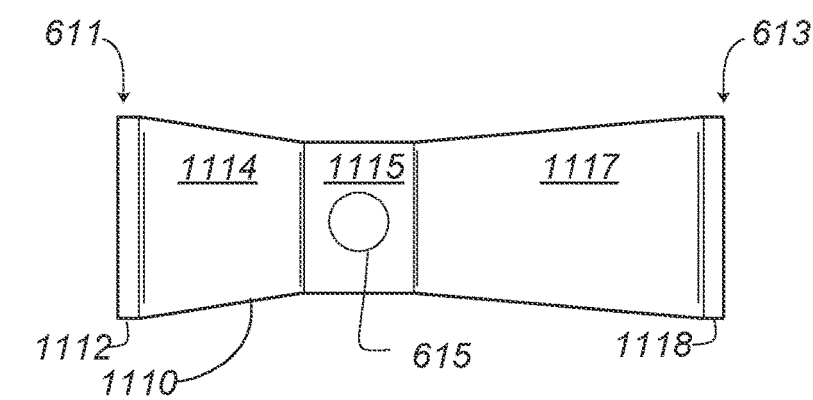
FIG. 11B is a top plan view of the fifth embodiment body of FIG. 11A.

FIG. 11A is a side elevational view of a fourth alternative embodiment body 1110, and FIG. 11B is a top plan view of the fifth embodiment elongated body. Body 1110 has an arched shape formed of several planar portions: a first end portion 1112 including first end 611, a second end portion 1118 including second end 613, a central portion 1115 having aperture 615, a first connecting portion 1114 that connects first end portion 1112 and the central portion, and a second connecting portion 1117 that connects second end portion 1117 and the central portion.

Body 1110 is similar to the other bodies disclosed, except that it asymmetric. Thus, central portion 1115 and aperture 615 are not located midway between ends 611 and 613, but are displaced to one side. Portions 1112 and 1118 are generally coplanar, and portion 1115 is in a plane parallel to that of portions 1112 and 1118. Accordingly, first connecting portion 1114 and second connecting portion 1117 have different lengths and angles relative to the plane of central portion 1115.

Figure 12:
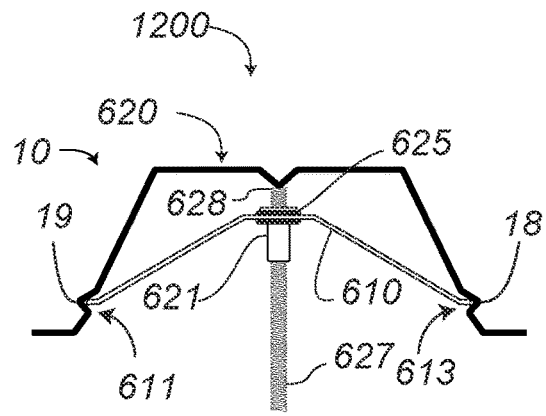
FIG. 12 is a side elevational view of a fifth embodiment hanger.

FIG. 12 is a side elevational view of a fifth embodiment hanger 1200 including body 610 attached to metal decking 10 using an assembly 620 including connector 621, grommet 625, and rod 627. Hanger 1200 is the same as the hanger 600 and may be used with the various embodiments of body 610, except as explicitly stated.

Thus, for example, grommet 625 may be placed into aperture 615 of body 610 and cylindrical body 622 is placed through grommet hole 626 with flange 624 in contact with the grommet, and rod 627 may be threaded into internal threaded aperture 623. Body 610 may then be pushed and or twisted towards metal decking 10 such that ends 611 and 613 are located in grooves 19 and 18, respectively. Alternatively, rod 627 may be threaded further such that the end of the rod contacts metal decking 10, as shown in FIG. 12. Rod 627 contacting metal decking 10 acts to stabilize the hanger during seismic event by limiting upwards motion of the hanger. After hanger 600 is attached to metal decking 10, a load may be attached to the end of rod 627 that protrudes below metal decking 10.

Alternatively, assembly 620 may include, in place of body 610, any one of bodies 810, 910, or 1010 to metal decking 10.

Figure 13:
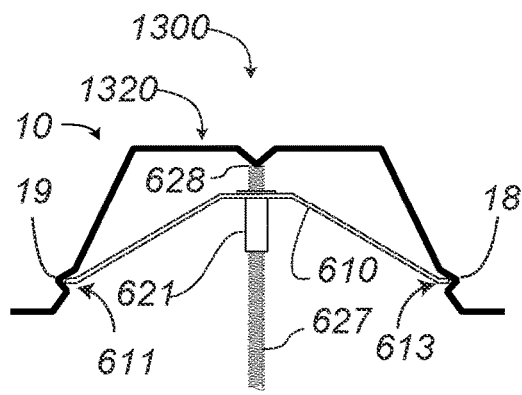
FIG. 13 is a side elevational view of a sixth embodiment hanger.

FIG. 13 is a side elevational view of a sixth embodiment hanger 1300 attached to metal decking 10. Hanger 1300 is similar to hanger 1200, with an assembly 1320 which is generally similar to assembly 620 but which does not include grommet 625.

Thus, for example, cylindrical body 622 may be placed through aperture 615 of body 610 with flange 624 in contact with the body, and rod 627 may be threaded into internal threaded aperture 623. Body 610 may then be pushed and or twisted towards metal decking 10 such that ends 611 and 613 are located in grooves 19 and 18, respectively. Alternatively, rod 627 may be threaded further such that the end of the rod contacts metal decking 10, as shown in FIG. 13. After hanger 1300 is attached to metal decking 10, a load may be attached to the end of rod 627 that protrudes below metal decking 10.

Alternatively, connector 621 and rod 627 may be used to attach any one of bodies 810, 910, or 1010 to metal decking 10.

Figure 14:
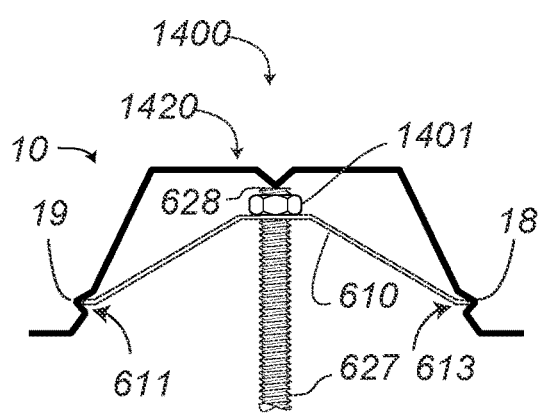
FIG. 14 is a side elevational view of a seventh embodiment hanger.

FIG. 14 is a side elevational view of a seventh embodiment hanger 1400 attached to metal decking 10. Hanger 1400 is similar to hanger 600, with an assembly 1420, but does not include grommet 625 or connector 621, but does include a nut 1401, and specifically includes body 610 attached to metal decking 10 using nut 1401.

Thus, for example, rod 627 may be inserted into hole threaded into internal threaded aperture 623. Body 610 may then be pushed and or twisted towards metal decking 10 such that ends 611 and 613 are located in grooves 19 and 18, respectively. Rod 627 may be threaded further such that the end of the rod contacts metal decking 10. A load may be attached to the end of rod 627 below metal decking 10.

Alternatively, nut 1401 may be used in an assembly to attach any one of bodies 810, 910, or 1010 to metal decking 10.

Figure 15:
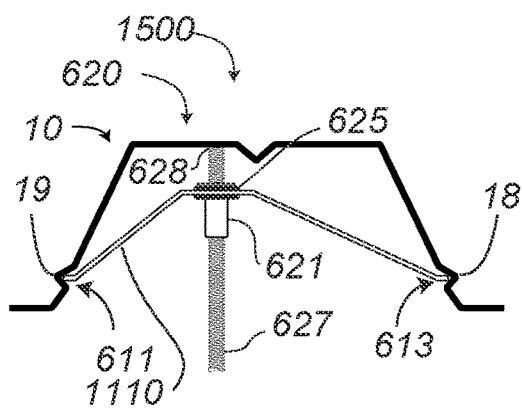
FIG. 15 is a side elevational view of a eighth embodiment hanger.

FIG. 15 is a side elevational view of a eighth embodiment hanger 1500, which includes attachment of the asymmetric body 1110 to metal decking 10 using assembly 620.

As with hanger 600, grommet 625 may be placed into aperture 615 of body 1110 and cylindrical body 622 is placed through grommet hole 626 with flange 624 in contact with the grommet, and rod 627 may be threaded into internal threaded aperture 623. Body 1110 may then be pushed and or twisted towards metal decking 10 such that ends 611 and 613 are located in grooves 19 and 18, respectively. Rod 627 is threaded into hanger 600 such that the rod end 628 contacts the metal decking.

Figure 16:
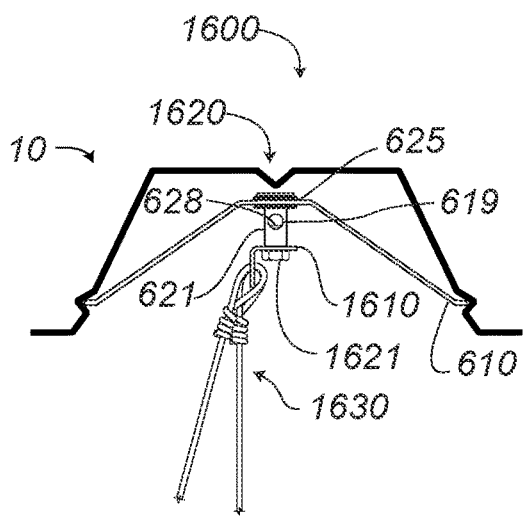
FIG. 16 is a side elevational view of a ninth embodiment hanger.

FIG. 16 is a side elevational view of a ninth embodiment hanger 1600, which includes body 610 attached to metal decking 10 with an assembly 1620 which is generally similar to assembly 620, except as discussed.

Figure 17A:
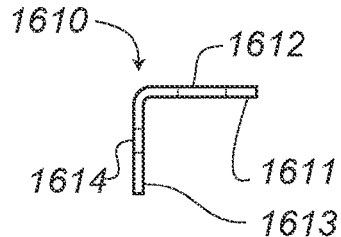
FIGS. 17A, 17B, and 17C are a side view, top view, and right side view, respectively, of support element.
Figure 17B:
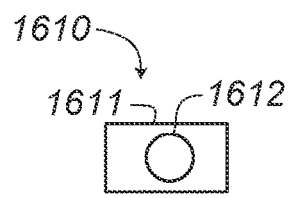
Figure 17C:
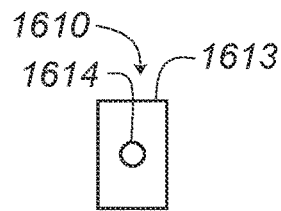

Assembly 1620 include connector 621, grommet 625, a support element 1610, a bolt 1621, and one or more wires 1630. FIGS. 17A, 17B, and 17C are a side view, top view, and right side view, respectively, of support element 1610. Support element 1610 is formed from metal and has a top 1611 having an aperture 1612 and a side 1613 having an aperture 1614. Aperture 1612 is size to accept a shank or threaded portion of bolt 1621, and aperture 1614 is sized to accept one or more wires 1630.

As with hanger 600, grommet 625 may be placed into aperture 615 of body 610 and cylindrical body 622 is placed through grommet hole 626 with flange 624 in contact with the grommet. The threaded portion of bolt 1621 is inserted through aperture 1612 and is threaded into internal threaded aperture 623 until the head of the bolt contacts support element 1610. Body 610 is pushed and or twisted towards metal decking 10 such that ends 611 and 613 are located in grooves 19 and 18, respectively. One end of wires 1630 may be secured through aperture 1614 and the other end of the wires may secure a load.

Alternatively, hanger 1600 may include one of bodies 810, 910, or 1010 in place of body 610.

Figure 18:
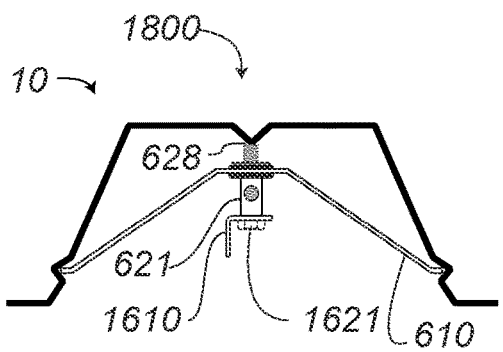
FIG. 18 is a side elevational view of a tenth embodiment hanger.

FIG. 18 is a side elevational view of a tenth embodiment hanger 1800, which is generally similar to hanger 1600, except that the threads of bolt 1621 are sufficiently long such that end 628 extends to and contacts metal decking 10.

Figure 19A:
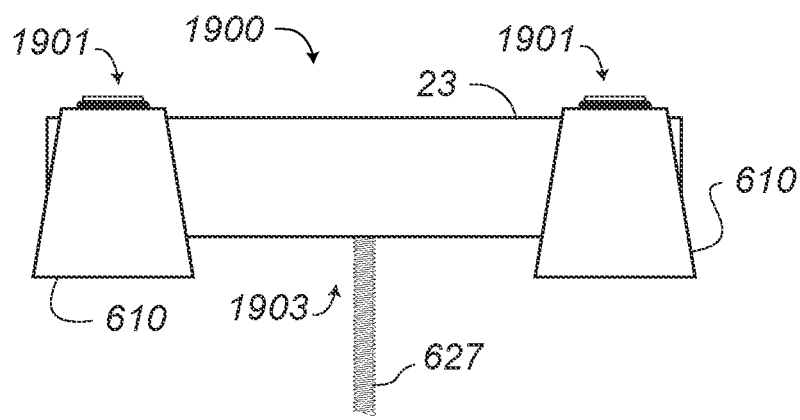
FIGS. 19A and 19B are a side elevational view and bottom view, respectively, of eleventh embodiment hanger.
Figure 19B:
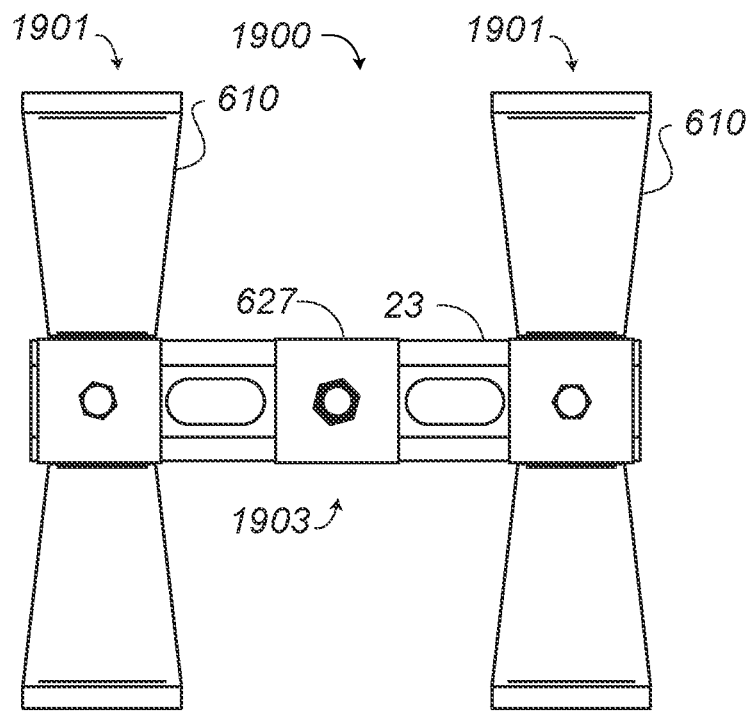

FIGS. 19A and 19B are a side elevational view and bottom view, respectively, of eleventh embodiment hanger 1900, which includes two generally similar hangers 1901 spaced along a strut channel 23 and a hanger support 1903 between the hangers 1901.

FIG. 19C is a perspective view of a prior art strut channel 20. Strut channel 20 is part of a standardized formed structural system that is defined by the Metal Framing Manufactures Association (Chicago, IL), and described in the document which is available at http://www.metal-framingmfg.org/MFMA%202004%20Standards.doc. Strut channel 20 is also referred to as a strut, and is commercially available from a number of companies, such as an not limited to, UNISTRUT® (Unistrut Corp., Harvey, IL), POWER-STRUT® (Atcor International, Harvey, IL), and SUPERSTRUT® (Thomas & Betts, Memphis, TN).

Strut channel 20 is formed from a sheet of material 27 formed to have a back 21 having one or more cut-outs 28, a front 23, and a pair of sides 22. Front 23 includes solid portions 24 that terminate in lips 25 that form an opening 26 which provides access to the interior of strut channel 20. Strut channel 20 may be formed, for example and without limitation, from 12 gauge, 14 gauge, 15 gauge, or 19 gauge metal, such as a low-carbon strip steel. The cross section of strut channel 20 may be square or may be rectangular.

FIG. 19D is a side view of one of hanger 1901, which includes a body 610 and an assembly 1920 including strut channel 20, connector 621, grommet 625, a support element 1610, a plate 1904, a spacer 1902, and a bolt 1621, where the plate and spacer both have holes to accept the threaded portion of bolt 1621.

Each hanger 1901 is assembled by placing grommet 625 in aperture 615 of body 610, inserting connector 621 through the grommet and into an aperture 28 of strut channel 20, and threading bolt 1621 through plate 1904 and spacer 1902 and tightening the bolt into the connector. Each hanger 1901 is attached to one of the ends of strut channel 20.

FIG. 19E is a side view of hanger support 1903, which includes an assembly 1930 including strut channel 20, connector 621, grommet 625, a support element 1610, a plate 1904, a spacer 1902, a threaded rod 627, and nut 1401, where the plate and spacer both have holes to accept the threaded portion of bolt 1621.

Hanger support 1903 is assembled by placing grommet 625 in aperture 615 of body 610, inserting connector 621 through the grommet and into an aperture 28 of strut channel 20 between the two hangers 1901, threading rod through plate 1904 and spacer 1902 into the connector, and tightening nut 1401 against plate 1904.

Figure 20:
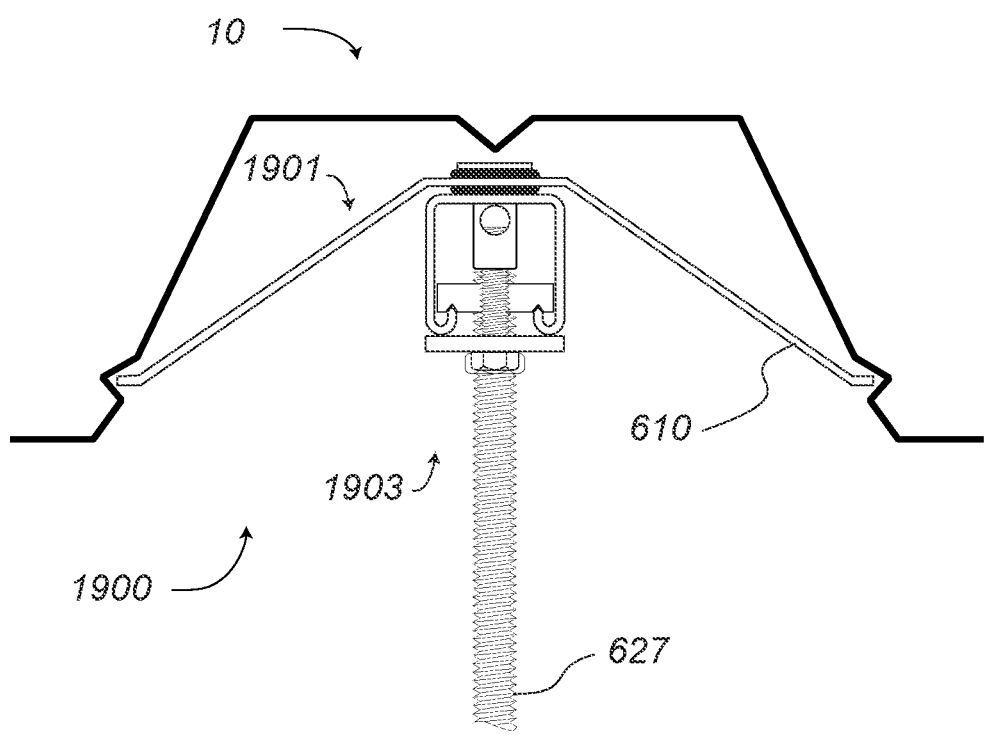
FIG. 20 is a side elevational view of an installed of the tenth embodiment hanger.

FIG. 20 is a side elevational view of a hanger 1900 attached to metal decking 10. Hanger 1900 may be attached to metal decking 10 by pushing the hanger toward the metal decking so that both hangers 1901 are compressed between the grooves of the metal decking, and a load may be suspended from rod 627.

Figure 21A:
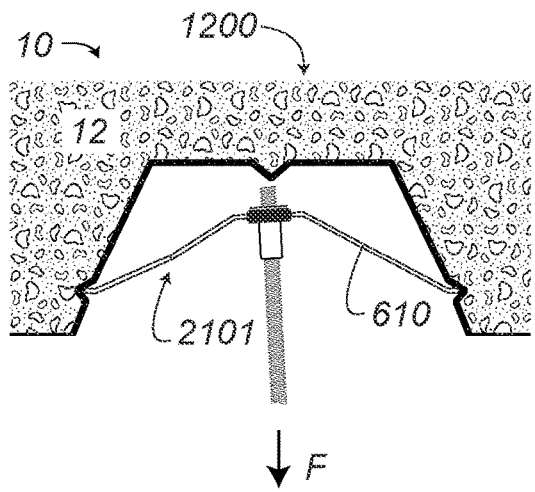
FIGS. 21A and 21B are temporally sequential side elevational views illustrating a first failure mode of a hanger.
Figure 22A:
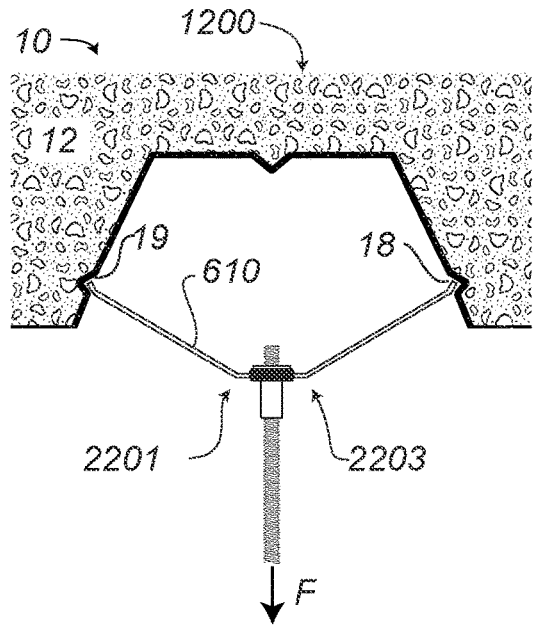
FIGS. 22A and 22B are temporally sequential side elevational views illustrating a second failure mode of a hanger.
Figure 21B:
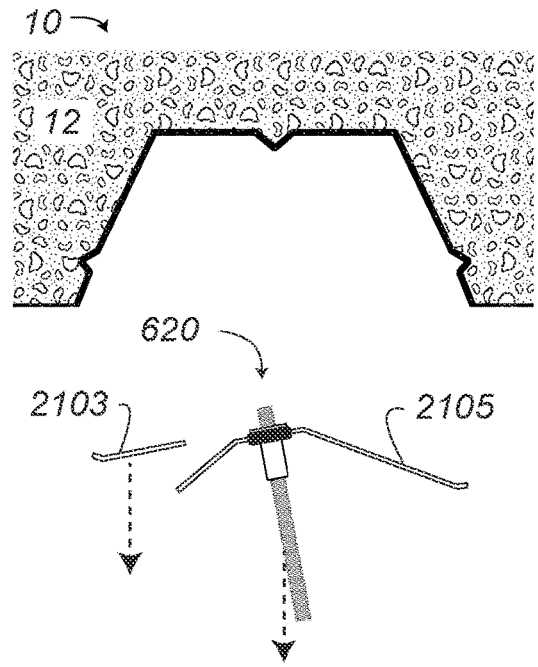
Figure 22B:
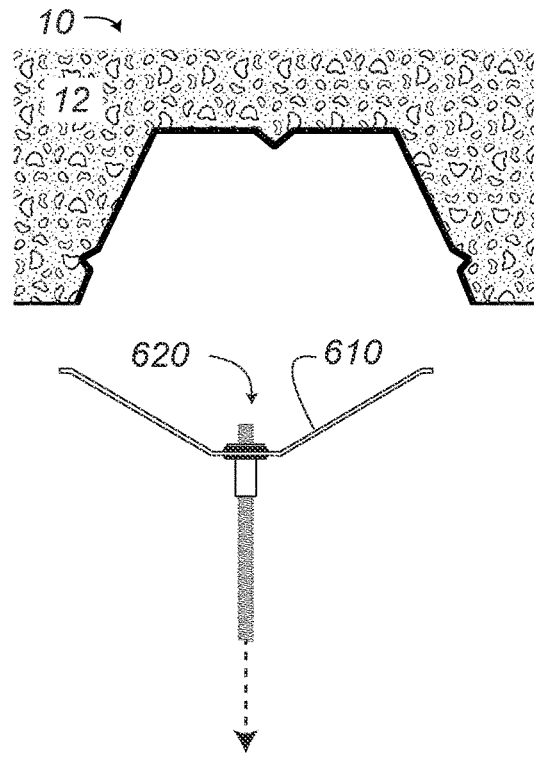

In certain embodiments, the hangers described herein may be designed so as to not damage the metal decking and/or concrete fill during a seismic event. As one example, FIGS. 21A and 21B are temporally sequential side elevational views illustrating a first failure mode of a hanger 1200, and FIGS. 22A and 22B are temporally sequential side elevational views illustrating a second failure mode of the hanger, where the hanger is installed in a metal decking 10 having a concrete fill 12. While FIGS. 21A, 21B, 22A, and 22B illustrate hanger 1200 with body 610, it would be apparent to one skilled in the art that one or both of the failure modes described with reference to FIGS. 21A, 21B, 22A, and 22B can occur with any of the other hangers and bodies described herein.

FIG. 21A illustrates hanger 1200 subjected to a load, F, sufficient to damage body 610 without damaging deck 10 or concrete 12. Specifically, body 610 responds to load F fracturing at body location 2101. As illustrated in FIG. 21B, body 610 then breaks into two parts—body part 2103 and 2105, which both fall away from metal decking 10, as illustrated by the arrows.

FIG. 22A illustrates hanger 1200 being subjected to a load, F, which is also sufficient to damage body 610 without damaging deck 10 or concrete 12. Specifically, body 610 responds to load F by ductile deformation, for example and without limitation, at body locations 2201 and 2203. This deformation inverts the shape of body 610, causing the hanger to be held less tightly in grooves 18, 19. As illustrated in FIG. 21B, deformed body 610 then falls from metal decking 10.

Reference throughout this specification to "one embodiment" or "an embodiment" means that a particular feature, structure, or characteristic described in connection with the embodiment is included in at least one embodiment of the present invention. Thus, appearances of the phrases "in one embodiment" or "in an embodiment" in various places throughout this specification are not necessarily all referring to the same embodiment. Furthermore, the particular features, structures or characteristics may be combined in any suitable manner, as would be apparent to one of ordinary skill in the art from this disclosure, in one or more embodiments.

Similarly, it should be appreciated that in the above description of exemplary embodiments of the invention, various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the Detailed Description are hereby expressly incorporated into this Detailed Description, with each claim standing on its own as a separate embodiment of this invention.

The invention claimed is:

1. A method of using a hanger for supporting a load from an underside of a metal decking, where the metal decking has a trough having a first groove opposing a second groove, where the first groove and said second groove have a groove spacing, where the hanger includes a body, where the body is flexible and has an unflexed distance between a first end and a second end that is greater than the groove spacing and an aperture, and where the hanger further includes a load support assembly removably insertable through the aperture and movable relative to the body and adapted to support the load, said method comprising:
  inserting the load support assembly through the aperture;
  contacting the first end of the body with the first groove of the metal decking;
  flexing the body to decrease the distance between the first end and the second end to a distance equal to or less than the groove spacing; and
  contacting the second end of the flexible body with the second groove of the metal decking,
  where the body includes
    a top surface extending between the first end and the second end, and
    a bottom surface opposite the top surface, where the aperture extends through the body from the top surface to the bottom surface, where the load support assembly includes
    a first portion sized to fit through the aperture and having a first end, and
    a second portion at least partially sized to not fit through the aperture,
  where the load support assembly extends through the aperture with the first end below the bottom surface and the second portion adjacent the top surface and is adapted to support the load, and
  where, when the body is placed with the first end in the first groove and the second end in the second groove, and a load is provided to the load assembly, the load is suspended below the metal decking,
  such that the body supports the load support assembly between the first groove and the second groove, and such that the load support assembly is movable relative to the flexible body.

2. The method of claim 1, further comprising supporting a load from the load support assembly.

3. The method of claim 2, where the metal decking is a concrete-filled metal decking, where the body has a first configuration where the body supports the load between the first groove and the second groove, and where the body has a second configuration in which when the load increases due to a seismic event, the load and damages the body such that the load is not suspended from the concrete-filled metal decking, and where the body is damaged before the concrete-filled metal decking is damaged.

4. The method of claim 3, where in the second configuration, the load fractures the body.

5. The method of claim 3, where in the second configuration, the load deforms the body.

6. The method of claim 3 further comprising
  selecting the body such that, when the hanger supports the load from the concrete-filled metal decking with the first end contacting the first groove and the second end contacting the second groove, and when the hanger is subjected to a seismic event, the body returns to the first configuration.

7. The method of claim 1, where said contacting the second end of the flexible body with the second groove of the metal decking includes:
  pushing the body into the trough such that the first end is in the first groove and such that the second end is in the second groove.

8. The method of claim 1, wherein the body between the first end and the second end is a unitary body.

9. The method of claim 1, where said first groove and said second groove define a nonhorizontal plane,
  such that after contacting the first end of the flexible body with the first groove of the metal decking and contacting the second end of the flexible body with the second groove of the metal decking, the first end of the flexible body and the second end of the flexible body are in the nonhorizontal plane, and the load support assembly supports the load without imparting a torque on the flexible body.

10. The method of claim 1, where said first groove and said second groove define a nonhorizontal plane, and where the load support assembly supports the load from a rod, said method further comprising supporting the load from the hanger with a rod.

11. The method of claim 1, where the first portion includes an internal thread adapted to support the load.

12. The method of claim 11, where said internal thread is adapted to accept a load-supporting threaded rod.

13. The method of claim 11, where said internal thread is adapted to accept a load-supporting bolt.

14. The method of claim 1, where said second portion is a nut.

15. The method of claim 1, further comprising a grommet between the load support assembly and the aperture.

16. The method of claim 1, where the first portion includes a bracket adapted to accept the load.

17. The method of claim 1, where said body includes
  a first planar portion,
  a second planar portion including the aperture, and
  a third planar portion,
  where said first planar portion extends from the first body end to the second planar portion with a first angle between the first planar portion and the second planar portion,
  where the second planar portion extends from the first planar portion to the third planar portion and includes the aperture, and
  where the third planar portion extends from the second planar portion to the second body end with a second angle between the second planar portion and the third planar portion.

18. The method of claim 17, where the first angle and the second angle are 180 degrees.

19. The method of claim 17, where the first angle is less than 180 degrees, where the second angle is less than 180 degrees, and where the second planar portion is parallel to and displaced by a distance from a plane containing the first body end and the second body end.

20. The method of claim 17, where said first planar portion and the third planar portion have the same length.

21. The method of claim 17, where said first planar portion is longer than the third planar portion.

* * * * *